US005421598A

United States Patent [19]

Robertson et al.

[11] Patent Number: 5,421,598

[45] Date of Patent: * Jun. 6, 1995

[54] MODULAR WHEELCHAIR

[75] Inventors: A. Scott Robertson, Pasadena; Richard Geiger, Santa Cruz; Robert W. Lishman, LaSelva Beach, all of Calif.

[73] Assignee: Everest & Jennings International, Ltd., St. Louis, Mo.

[ * ] Notice: The portion of the term of this patent subsequent to Sep. 1, 2009 has been disclaimed.

[21] Appl. No.: 937,831

[22] PCT Filed: Apr. 26, 1991

[86] PCT No.: PCT/US91/02797

§ 371 Date: Dec. 18, 1992

§ 102(e) Date: Dec. 18, 1992

[87] PCT Pub. No.: WO91/17077

PCT Pub. Date: Nov. 14, 1991

[51] Int. Cl.[6] .................... B62M 1/14

[52] U.S. Cl. .................... 280/250.1; 280/304.1; 280/650; 297/423.26; 297/423.3

[58] Field of Search .................... 280/250.1, 304.1, 650, 280/661, 657; 297/DIG. 4, 16.2, 354.1, 423.17, 423.19, 423.26, 423.3, 440.14, 378.1, 378.12; 301/111, 114, 137, 132; 403/1, 4, DIG. 8; 188/20, 2 F

[56] References Cited

U.S. PATENT DOCUMENTS

| | | | |
|---|---|---|---|
| 4,046,418 | 9/1977 | Smith et al. | 296/118 |
| 4,494,889 | 1/1985 | Thompson | 403/16 |
| 4,592,570 | 6/1986 | Nassiri | 280/650 |
| 4,749,064 | 6/1988 | Jinno | 188/74 |
| 4,852,899 | 8/1989 | Kueschall | 280/250.1 |
| 4,887,826 | 12/1989 | Kantner | 280/250.1 |
| 4,997,154 | 3/1991 | Little | 248/225.31 |
| 5,076,602 | 12/1991 | Robertson et al. | 280/250.1 |
| 5,131,672 | 7/1992 | Robertson et al. | 280/250.1 |
| 5,143,391 | 9/1992 | Robertson et al. | 280/250.1 |
| 5,176,393 | 1/1993 | Robertson et al. | 280/250.1 |

*Primary Examiner*—Margaret A. Focarino
*Assistant Examiner*—Ann Boehler
*Attorney, Agent, or Firm*—Burns, Doane, Swecker & Mathis

[57] ABSTRACT

A modular wheelchair that is fully adjustable for a wide range of users in a wide range of uses includes a wheelchair chassis, a wheel assembly and a seat assembly. Drive wheels of the wheel assembly may be adjusted to have a different camber angle without changing the wheel base or the height of the wheelchair chassis. The modular wheelchair may also include a leg rest assembly that is adjustable to provide easy access to the wheelchair. The seat assembly and the leg rest assembly are each foldable so that the wheel chair may be easily stored.

22 Claims, 11 Drawing Sheets

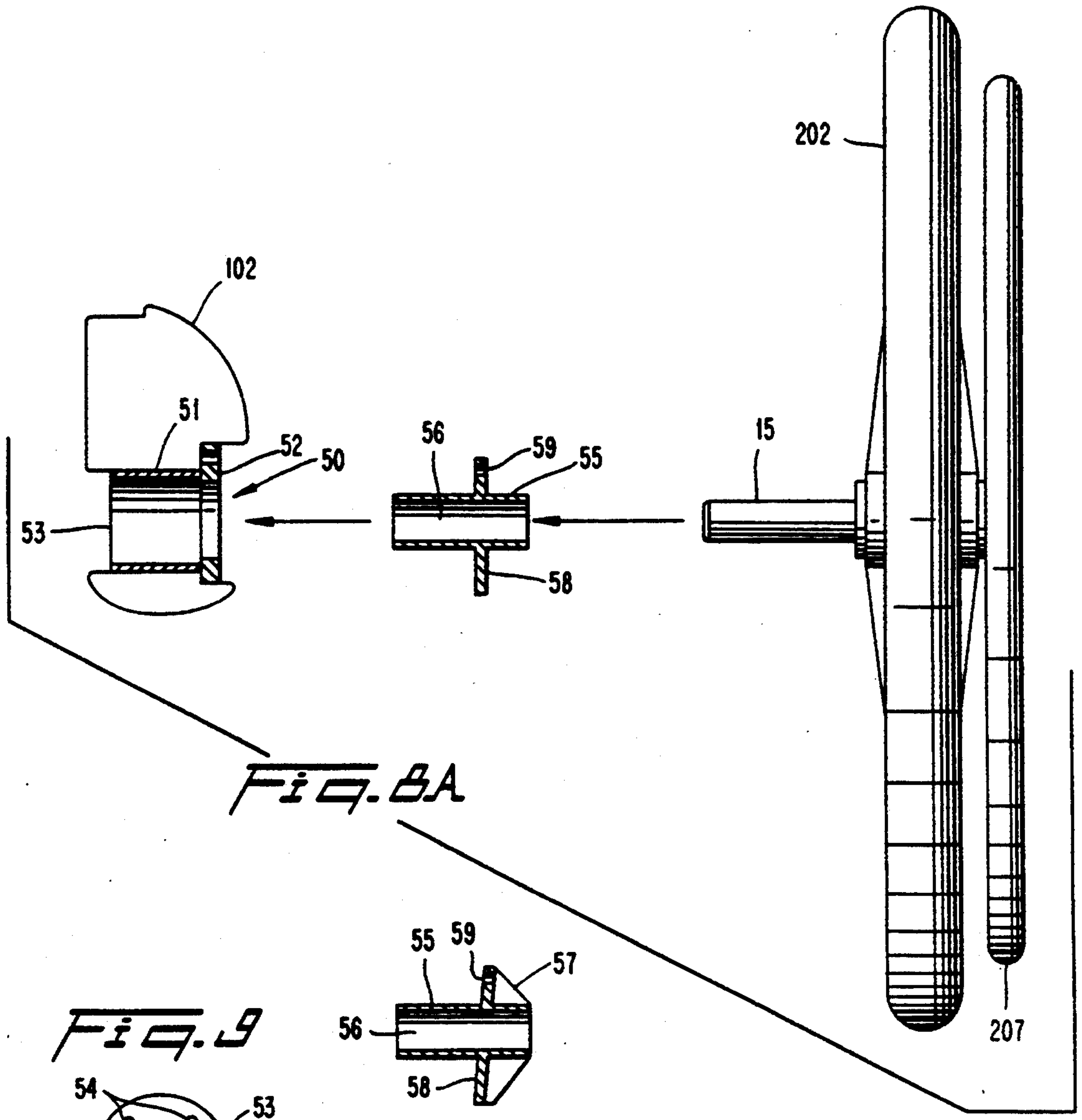
Fig. 8A
Fig. 9
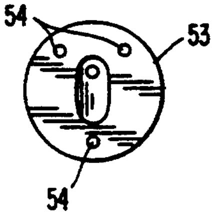
Fig. 11A
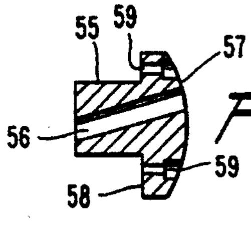
Fig. 11B
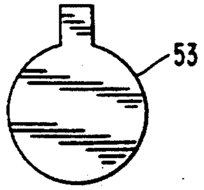
Fig. 10
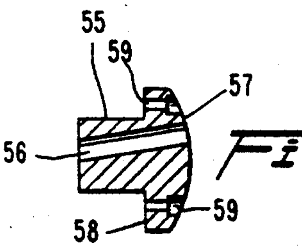
Fig. 11C

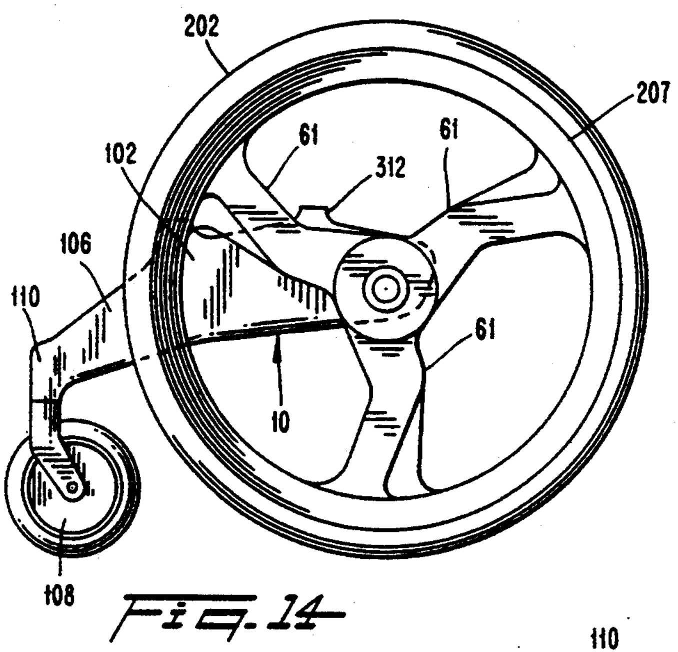
Fig. 14
Fig. 13
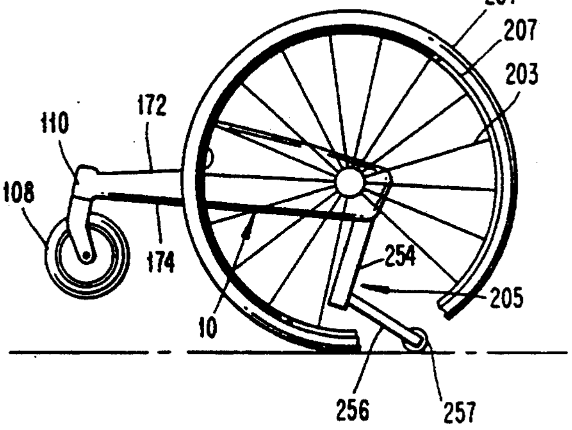
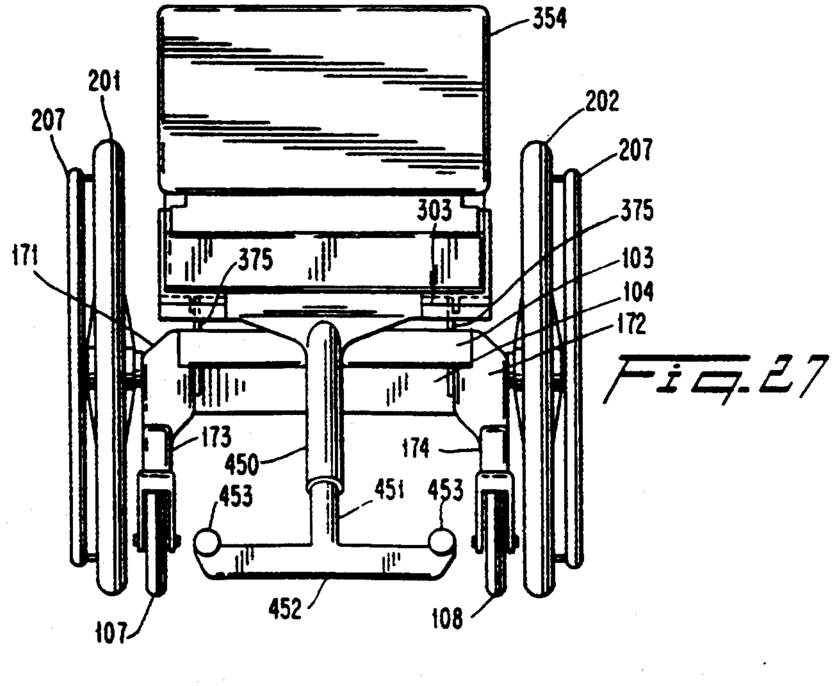
Fig. 27

Fig. 15
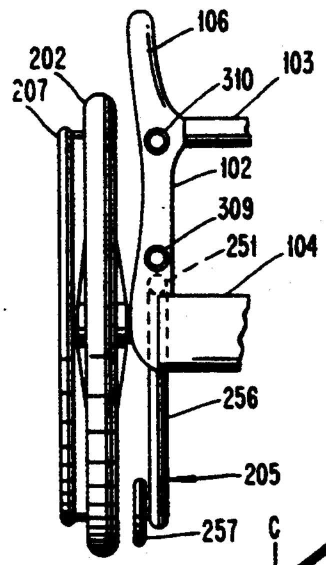
Fig. 16
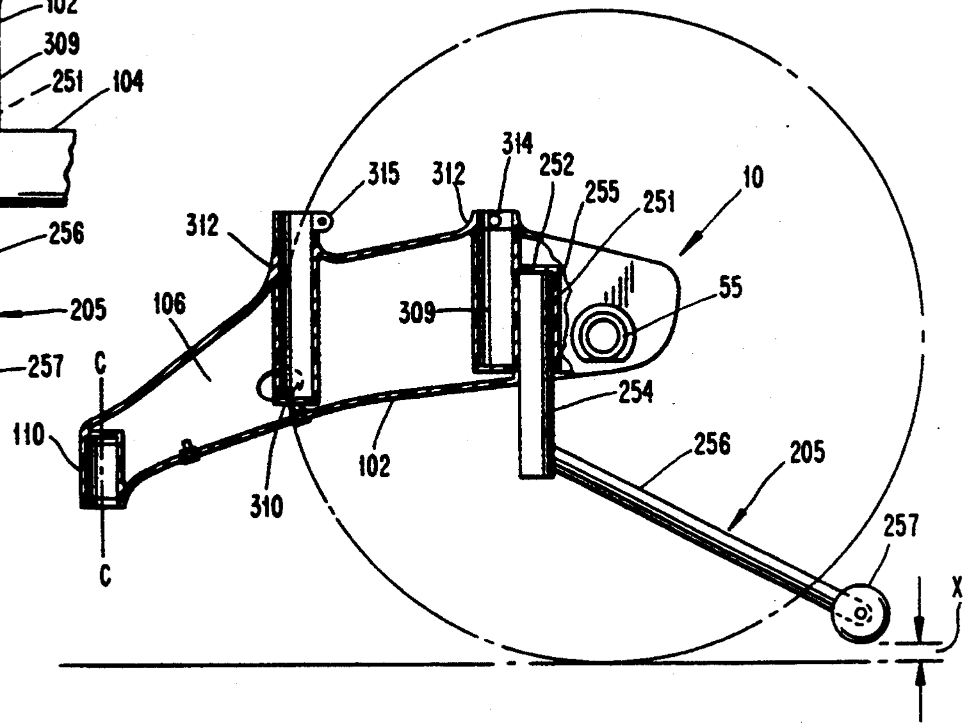
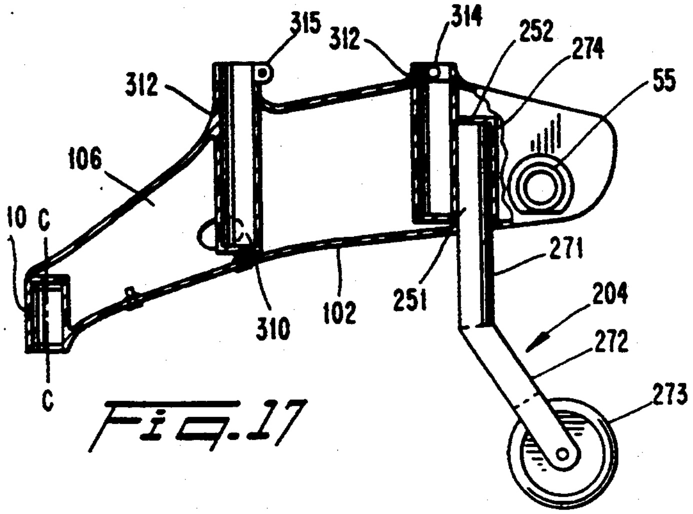
Fig. 17

Fig.18
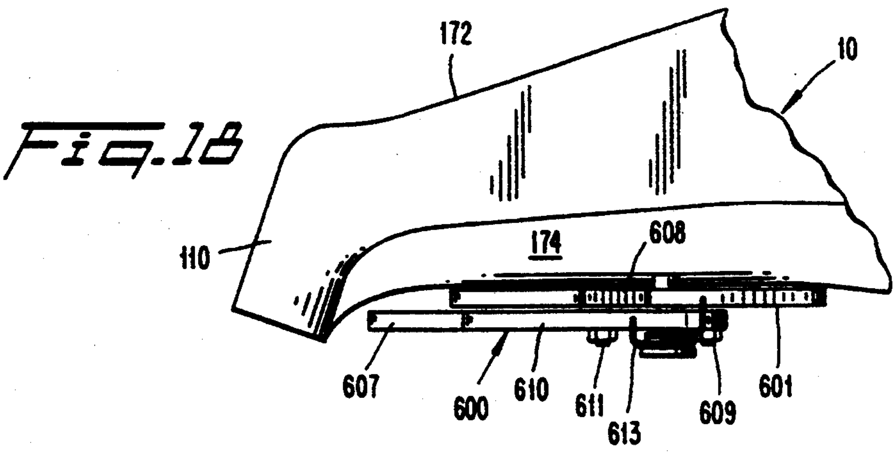
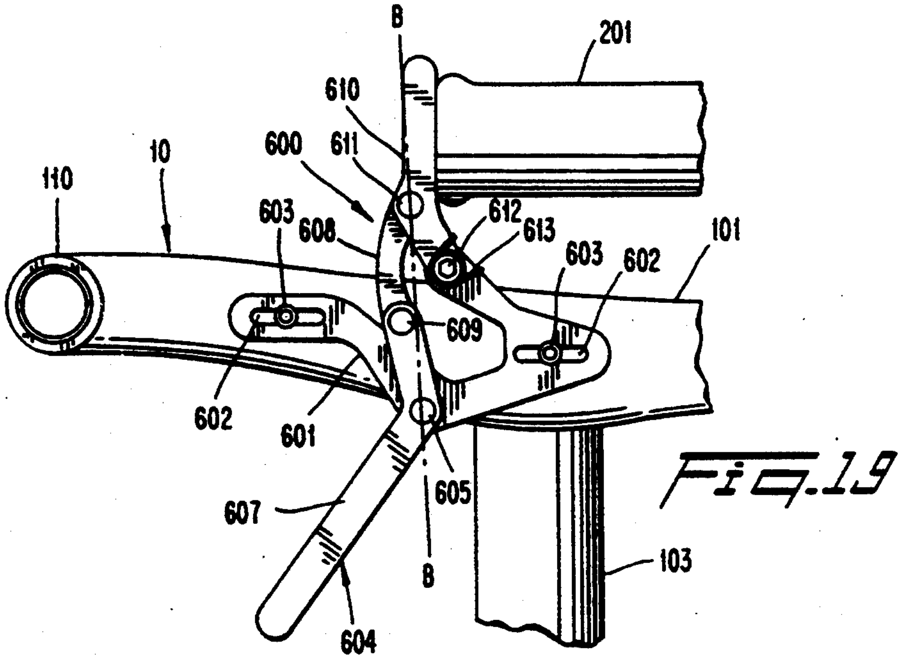
Fig.19
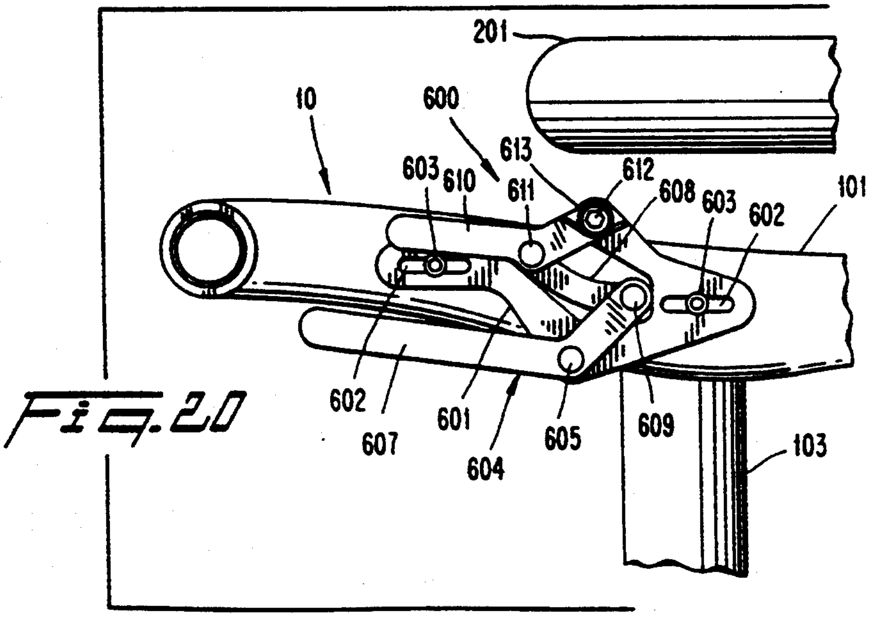
Fig.20

Fig. 23
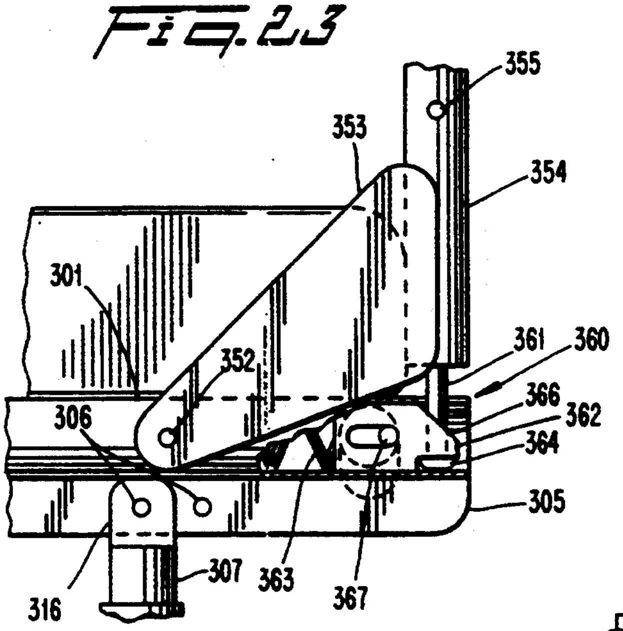
Fig. 24
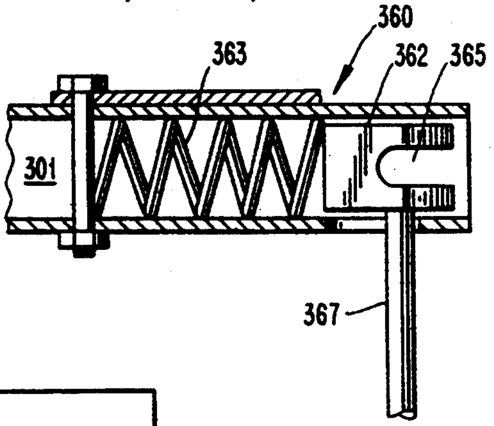
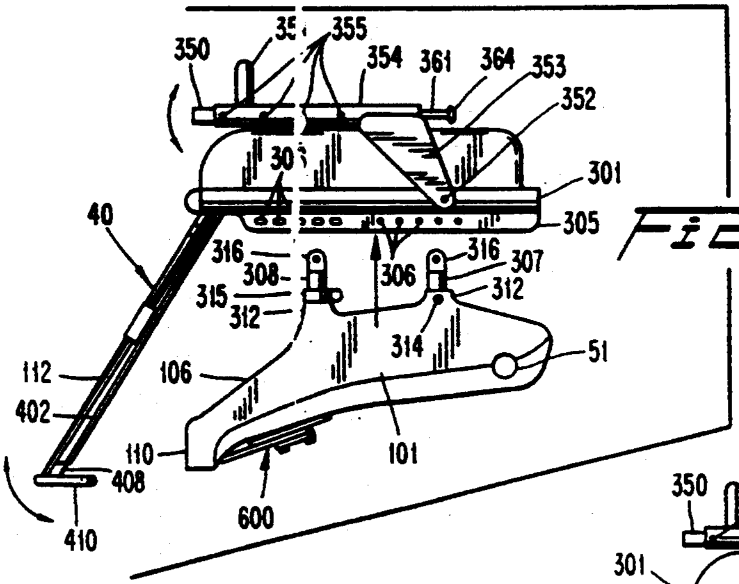
Fig. 21
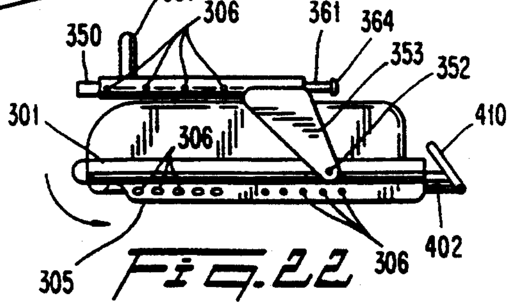
Fig. 22

MODULAR WHEELCHAIR

FIELD OF THE INVENTION

The present invention relates to wheelchairs. More specifically, the present invention relates to the combination of a wheelchair chassis, a wheel assembly, a seating assembly and leg rest assembly for forming a modular wheelchair.

BACKGROUND AND SUMMARY OF THE PRESENT INVENTION

Wheelchairs are well known transportation appliances enabling the infirm, disabled and unwell person to move about with greater mobility than otherwise. Essentially, wheelchairs are small, single person conveyances typified by a chair supported by two outer, large diameter drive wheels, and with two smaller pilot wheels or caster wheels located in front of the user's center of gravity. The chair may include a padded seat, or it may include a webbing or sling seat. Alternatively, the chair may be molded from a suitable material. A chair back is typically provided for the user's comfort. A leg rest assembly may be attached to the seat. Motive power may be supplied by an attendant pushing the wheelchair, by the user's hands and arms, or by an auxiliary power source.

While current designs of wheelchairs have proliferated, needs continue to arise that are not satisfactorily addressed by these current designs. For example, in current designs, it is often difficult to remove the leg support device for storage during travel or to adjust the leg support device for accommodation of single or double amputees. Such designs also often fail to provide a leg rest that is easily adjustable to support a particular leg length or that is adjustable to improve the space constraints when entering and exiting the wheelchair.

Other problems have arisen with regard to seating systems of current wheelchair designs. For example, present wheelchair seating systems are not always sufficiently collapsible into an easily stored configuration. Nor are present seat system designs easily adjustable to orient the height or center of gravity of the user when situated in the chair.

When a particular wheel camber is desired for a particular application, present designs often fail to provide a wheelchair wherein the wheel camber angle can be easily and quickly adjustable. Furthermore, in those designs that do have a variable camber feature, oftentimes, the wheel base and the seat height are undesirably affected after a camber angle change so as to result in a wheelchair being too wide or sitting too low.

Current designs also tend to have too rigid a framework. Consequently, travel over rough and unpaved surfaces can be especially uncomfortable to the user since shock and vibration is easily transmitted through the rigid framework.

When traveling, a user desires a wheelchair that is maneuverable through narrow passageways and that is convenient to store in a storage compartment, e.g., an aircraft storage bin. In addition, the especially active user prefers a wheelchair that is easily adaptable to different uses, e.g. for sports activities such as tennis or basketball or for normal transportation needs. Furthermore, a user prefers a wheelchair that is adjustable in a wide variety of positions so as to allow proper support according to the particular needs of a user. Current designs have not satisfactorily addressed all of these needs in a single wheelchair.

A general object of the invention is to provide a modular wheelchair that overcomes the limitations and drawbacks of the current designs, some of which have been described above.

Another object of the present invention is to provide a wheelchair having wide adjustability so as to provide proper support for a wide range of users under a wide range of uses.

Another object of the present invention is to provide a wheelchair that is Sturdy yet comfortable for a user during travel over a wide range of travel surface conditions.

Another object of the present invention is to provide a wheelchair that is easily maneuverable in cramped locations.

Another object of the present invention is to provide a wheelchair that allows ease of access by the user to and from the wheelchair.

Another object of the present invention is to provide a wheelchair that protects a user's clothing, hands, etc. from being damaged or injured during travel or braking of the wheelchair.

Another object of the present invention is to provide a wheelchair that is easily disassembled and assembled during travel or during adjustment of the wheelchair.

Another object of the present invention is to provide a wheelchair that is highly versatile yet economic to produce.

These and other objects not specifically enumerated above are accomplished by a modular wheelchair in accordance with the present invention.

The modular wheelchair in accordance with the present invention includes a main frame and a pair of main driving wheels. The main driving wheels are mounted on opposite sides of the main frame such that the main frame is positioned at a desired distance from the travel surface. A pair of casters are also mounted on opposite sides of the main frame, however, the pair of casters are situated forward of the pair of main driving wheels.

The modular wheelchair also includes a hub mechanism for adjusting a camber angle of each of the main driving wheels while maintaining the main frame at the desired distance from the travel surface.

A seat assembly is provided that is detachably securable to the main frame. The seat assembly includes a mechanism for adjusting the center of gravity of the seat assembly relative to the main frame while maintaining the main drive wheels at a predetermined wheel base.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

Preferred embodiments of the present invention will be described in detail with reference to the accompanying drawings, wherein like members bear like reference numerals and wherein:

FIGS. 8A–8B are exploded views of a camber adjustment mechanism in accordance with the present invention;

FIG. 9 is a front view of a mounting plate of the camber adjustment mechanism of the present invention;

FIG. 10 is a front view of a second embodiment of a mounting plate of the camber adjustment mechanism in accordance with the present invention;

FIGS. 11A–11C are cross-sectional views of a plurality of interchangeable wheel attachment plugs of the camber adjustment mechanism in accordance with the present invention;

FIG. 13 is a side view of one embodiment of the wheelchair chassis and wheel assembly in accordance with the present invention;

FIG. 14 is a side view of a second embodiment of a wheel assembly as mounted on a wheelchair chassis in accordance with the present invention;

FIG. 15 is a partial top view of one side of a wheelchair chassis and wheel assembly in accordance with the present invention;

FIG. 16 is a cross-sectional view of the wheelchair chassis and an anti-tip assembly in accordance with the present invention;

FIG. 17 is a partial cross-sectional view of the wheelchair chassis and a travel wheel assembly in accordance with the present invention;

FIG. 18 is a side view of a wheel lock assembly mounted on the wheelchair chassis in accordance with the present invention;

FIG. 19 is a bottom view of the wheel lock mechanism of FIG. 18 as configured in a locking position;

FIG. 20 is a bottom view of the locking mechanism of FIG. 18 in an unlocked configuration;

FIG. 21 is an exploded side view of the wheelchair chassis, the seat assembly, and the leg rest assembly in accordance with the present invention;

FIG. 22 is a side view of the seat assembly and the leg rest assembly as configured in a folded position;

FIG. 23 is a partial cross-sectional side view of a latching mechanism of the seat assembly in accordance with the present invention;

FIG. 24 is a partial cross-sectional top view of the latching mechanism of FIG. 23;

FIG. 27 is a front view of the modular wheelchair of FIG. 6;

DETAILED DESCRIPTION OF THE PREFERRED EMBODIMENTS

Figure 1:
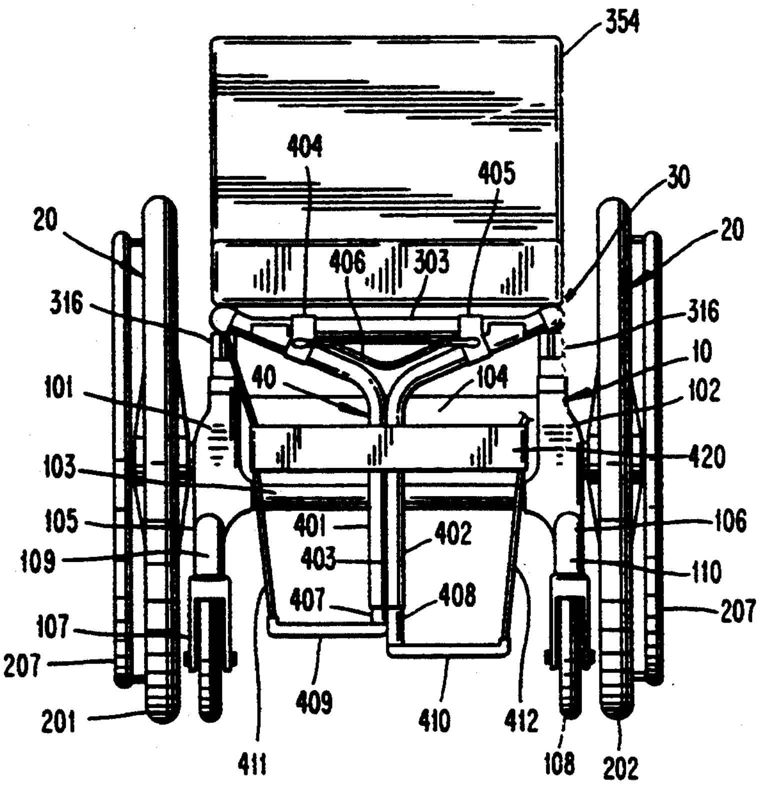
FIG. 1 is a front view of a modular wheelchair in accordance with the present invention.
Figure 2:
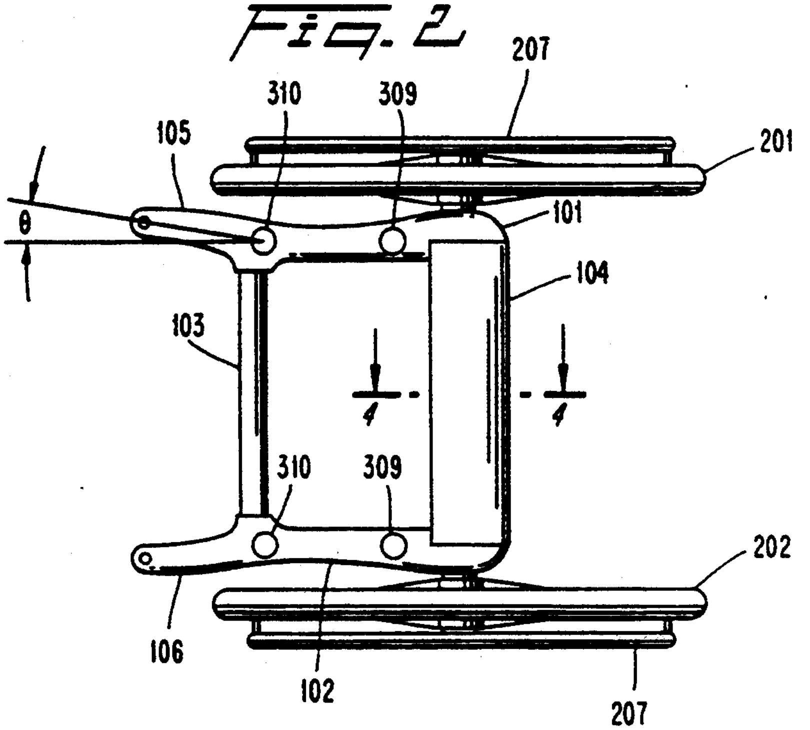
FIG. 2 is a top view of a wheelchair chassis and wheel assembly in accordance with the present invention.

Referring to FIGS. 1 and 2, a modular wheelchair embodying the principles of the present invention is generally shown and includes the following detachable, modular components: a chassis 10, a wheel assembly 20 attached to the chassis 10, a seating assembly 30 attached to the chassis 10, and a leg rest assembly 40 attached to the seating assembly 30.

Wheelchair Chassis

The chassis 10 embodying principles of the present invention can be formed from a variety of composite materials by compression molding, injection molding, resin transfer molding, or by a number of other known molding techniques such as preform or knitting techniques. Composite materials may include carbon, glass, graphite, or aramid fibers (or combinations thereof), or preimpregnated cloth or unidirectional tape made from the same listed substances or combinations thereof. Polyester, vinyl, epoxy or other similar substances are used as resins and may be combined with the fibers, or injected in the case of resin transfer molding. Fillers, such as glass beads or mineral varieties are typically included.

The composite material may be tailored to preselected use specifications. Presently, it is preferred to construct the chassis 10 by compression molding or sheet molding compound using a combination of E-glass and carbon short fiber and carbon or glass preimpregnated tape and/or cloth with a vinyl ester resin and glass-bead filler. Continuous length fibers may be used locally. All surfaces are contoured to provide a rounded, smooth and streamlined appearance to the chassis 10.

Figure 3:
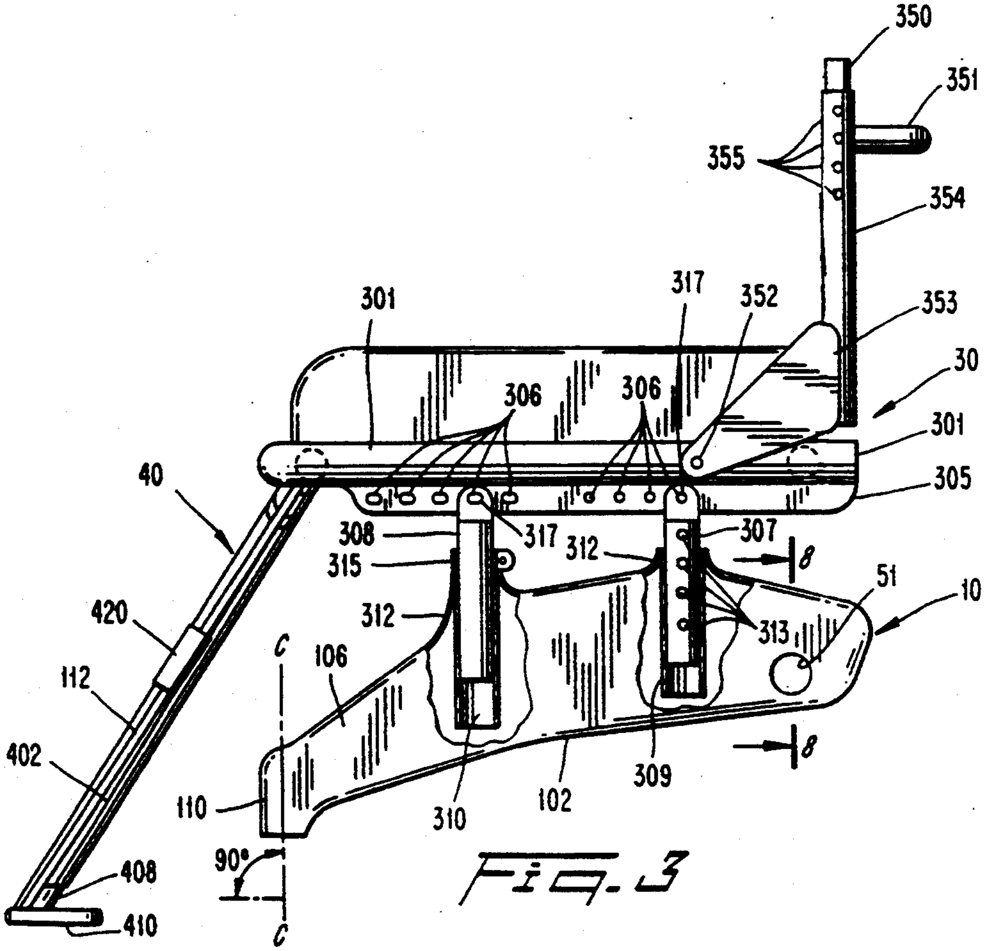
FIG. 3 is a partial cross-sectional side view of the wheelchair chassis and seat assembly and leg rest assembly in accordance with the present invention.

Referring to FIGS. 2 and 3, the chassis 10 is formed of two hollow or foam filled, longitudinal side rails 101 and 102 connected by cross-bars 103, 104, at least one of which is either hollow, knitted preform, foam filled, or formed metal. As shown in FIG. 3, the forward end of side rail 101 extends forward and downward to form a cantilevered or trussed arm 105. Side rail 102 is similarly configured to form cantilevered or trussed arm 106. As shown in FIG. 1 two swivel-mounted casters 107 and 108 are attached by snap-locks to sleeves 109, 110 in the arms 105 and 106, respectively, and are, thereby positioned forward of drive wheels 201 and 202. The axis of the casters 107, 108 when mounted on the chassis 10 is fixed at 90 degrees relative to the ground surface and the base of the drive wheels 201, 202 in order to prevent a self-steering tendency of the swivel caster wheels 107, 108. Adjustment of the camber angle of the wheelchair as described below does not affect the fixed axis of the caster wheels 107, 108.

As shown in FIG. 3, the sleeve 110 of the arm 106 extends below the plane of the side 102. The sleeve portion 109 is similarly configured on the opposite side of the chassis 10. The composite material of the arms 105, 106 provides vibration and shock absorbing functions for the wheelchair. The composite material of chassis 10 causes the flexible and resilient arms 105, 106 to yield slightly under a vertically directed impact. The arms 105, 106 individually react to impact and may flex slightly to maintain the alignment of the upper frame portion of the chassis 10.

Figure 4:
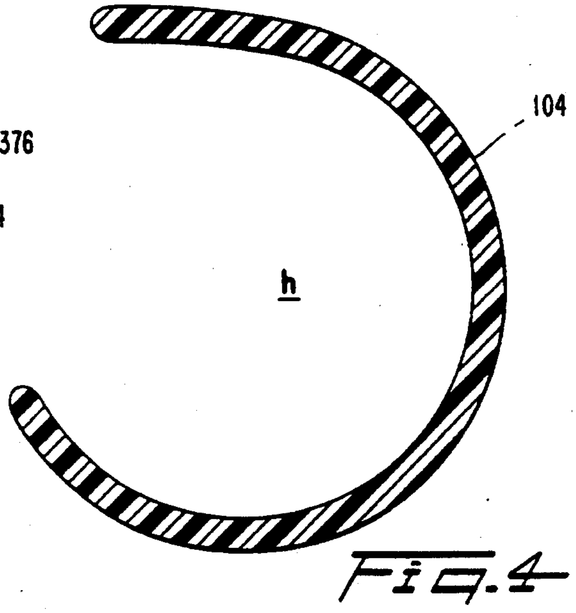
FIG. 4 is a cross-sectional view along the line 4—4 of FIG. 2.

Composite materials are known to be lightweight, strong, resilient, and moldable. The amount of resilience can be preselected during manufacture using techniques well established among those skilled in the art of composite materials. For example, the chassis may be formed from fiber resin unidirectional tape of a selected fiber composition, alignment and density thereby preselecting the known shock absorbing properties of the composite material for a predetermined impact direction. The chassis sides 101, 102 and cross-bars 103, 104 are hollow or foam filled shells thereby creating a lightweight chassis able to receive components, such as drive motors, to be stored within hollow shells. Referring to FIG. 4, the cross-bar 104 is generally formed into a C-shape as shown in cross section. Such a configuration provides a hollow composite C-shaped shell thereby defining an interior hollow space "h" which may be fitted with two drive motors (not shown) for independently driving the drive Wheels 201, 202, respectively.

The arms 105, 106 are angularly disposed in a lateral plane relative to the longitudinal sides 101, 102, respectively, at an acute angle $\theta$ from approximately 5 degrees to 20 degrees as shown in FIG. 2. The angled positioning of the arms 105, 106 makes it easier to closely approach the seat of the wheelchair and creates useful storage space underneath the chassis and seat. The space may also be used for receiving auxiliary equipment such as a power supply or other electronic components.

The chassis 10 may be formed into two hollow or foam filled halves that are connected by telescoping crossbars (not shown) that are secured to the longitudinal side rails 101 and 102 to form a unitary chassis 10. The telescoping bars permit the user to adjust the width of the chassis. In this aspect, the cross bars of the seating system are also of adjustable width. Alternatively, the crossbars may be of a preselected length to permit the wheelchair to be of a custom size for a particular user's needs.

Figure 6:
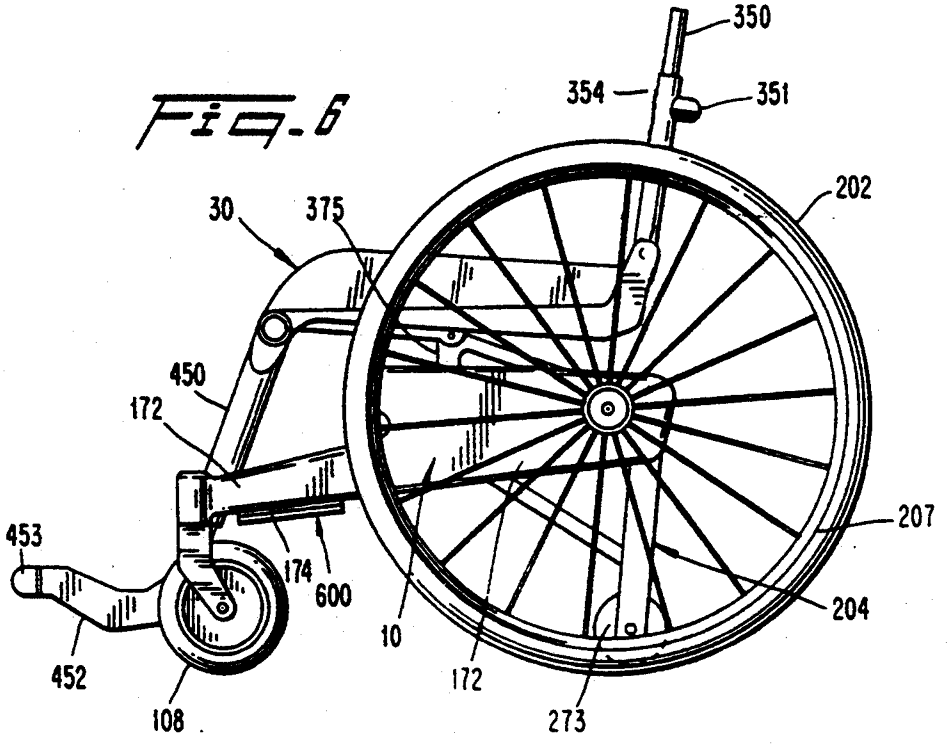
FIG. 6 is a side view of a second embodiment of a modular wheelchair in accordance with the present invention.
Figure 5:
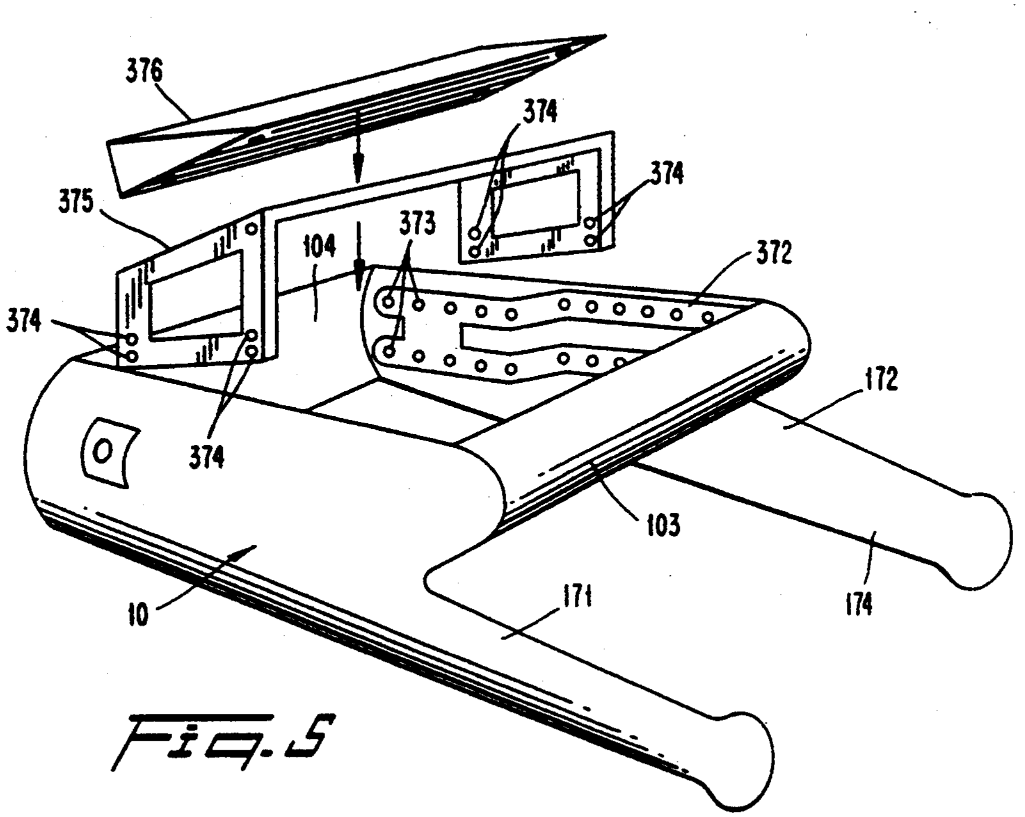
FIG. 5 is a perspective view of a second embodiment of a wheelchair chassis in accordance with the present invention.
Figure 7:
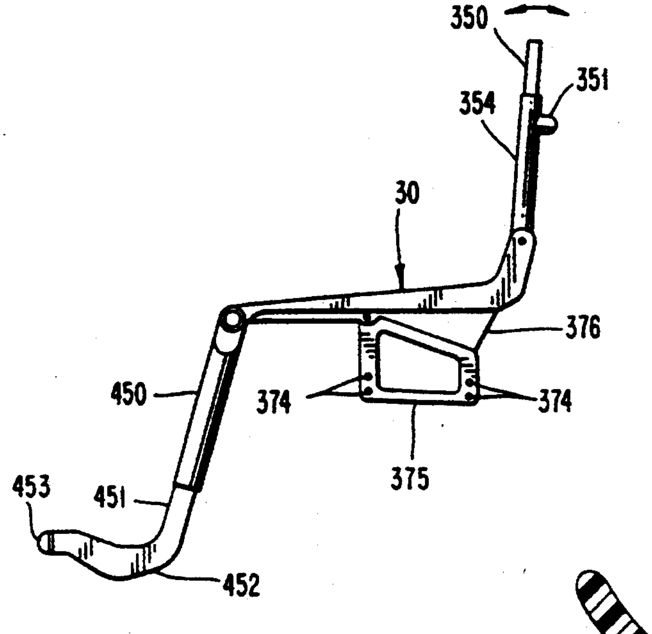
FIG. 7 is a side view of a seat assembly in accordance with the present invention.

Referring to FIGS. 5–7, the chassis 10 may also be formed such that seat mounting rails 371 (not shown) and 372 for the seat assembly 30 are molded as plates in the inside surface of the longitudinal side rails 171 and 172 of the chassis 10. The metallic rails 371, 372 are bonded into the chassis 10 during its construction, or may be attached by rivets. A multitude of holes 373 are included to align with mating holes 374 in a seat bracket 375. The seat bracket 375 is secured to the rails 371, 372 using quick release pins (not shown), or alternatively by conventional pins or bolts.

The seat bracket 375 and the rails 371, 372 include holes 374, at differing heights thereby enabling the seat height to be adjusted. The plurality of longitudinally extending rail holes 374 additionally enable the lateral position of the seat to be adjusted thereby adjusting the center of gravity of the chair. The forwardly extending arms 173 and 174 form a preselectable acute angle with the longitudinal sides 171, 172 respectively. In this embodiment, seating placement may also be adjusted by a seat shim 376. The seat shim 376 is exchangeable with other shims (not shown) thereby allowing shim angles to be selected from 0 to 12 degrees.

FIG. 7 shows a seat assembly 30 usable with this chassis design as secured to a wheelchair using the chassis 10 as shown in FIG. 6.

Camber Adjustment Fitting

Referring now to FIG. 8, a sectional view of one rail 102 of the chassis 10 is shown with a camber plug attachment mechanism shown generally at 50. An identical attachment mechanism 50, is provided for the opposite rail 101 of the chassis 10. A cylindrical recess 51 is located within the outer surface of the rail 102. The cylindrical recess 51 extends from a notched bracket portion 52 of the outer surface of rail 102, and terminates at a molded-in mounting plate 53, shown in FIG. 9, bearing a pattern of holes 54. A mating pattern of holes (not shown) are included in the plugs 55 thereby enabling a plug 55 to be aligned and attached by screws within the recess 51 in only one alignment. Alternatively, the plugs 55 may be attached to a mounting plate 53 having a keyway, as shown in FIG. 10.

Referring to FIGS. 11A–11C, a number of interchangeable camber angle adjustment plugs 55 constructed by a variety of methods and embodying principles of the present invention are shown. The camber plugs may be constructed by brazing or welding a formed bore 56, to a plate at a preset camber angle as shown in FIG. 11A, or by drilling a bore 56 at a selected camber angle through a cast or machined block of a suitable substance such as aluminum magnesium or plastic material as shown in FIGS. 11B and 11C. Alternatively, the camber plugs may be molded from fiber reinforced material and cast around the positioned and angled bore, or the bores may be stamped directly into a plate.

The preferred method of constructing the camber plugs 55 is by brazing or welding metallic, cylindrical formed bores at a variety of selected angles on to circular metallic plates bearing three mounting holes.

Figure 8B:
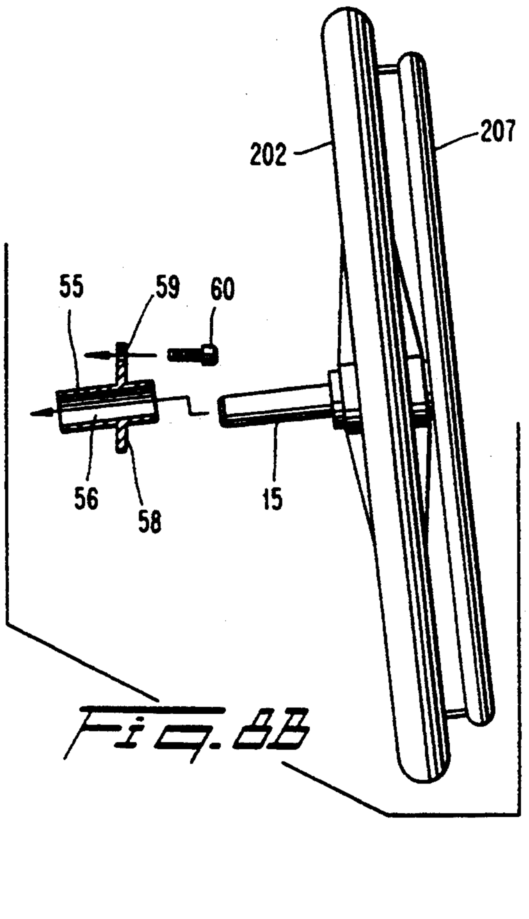

Referring now to FIGS. 8A and 8B, the method of alignment whereby the camber plugs 55 take up the vertical height difference when the wheel is angled, thereby maintaining a constant wheelbase, is demonstrated. The non-cambered wheel in FIG. 8A is shown having the axle 15 aligned with the plug 55, prior to attachment within recess 51. FIG. 8B shows a cambered wheel and the bore 56 placed at the selected camber angle while retaining the fixed wheelbase alignment. A screw 60 is shown for securing the plug 55 within the recess 51.

Figure 12:
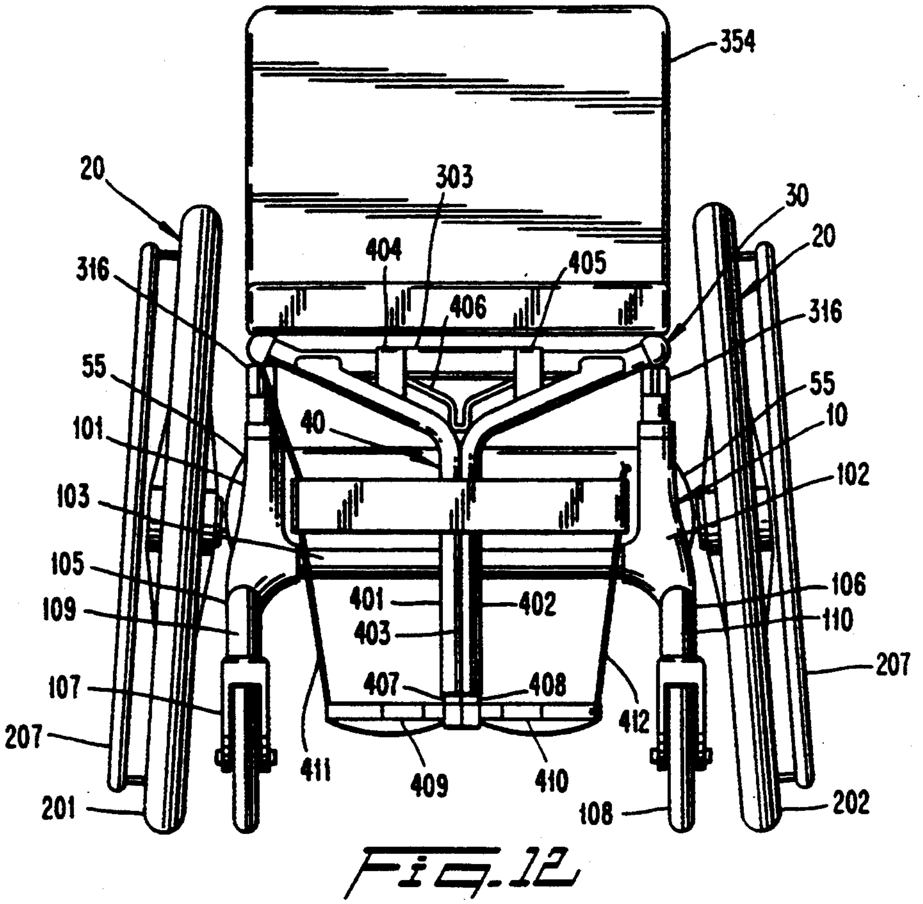
FIG. 12 is a front view of a modular wheelchair configured with cambered wheels in accordance with the present invention.

One end of the stationary drive wheel axle 15 is mounted within the bore 56 of the plug 55, and the opposite end of the axle is snap-mounted within the wheelhub for rotation of the wheel. Conventional bearings are included within the wheel assembly for rotation of the wheels. The alignment plug 55 and the wheel mounting mechanism 50 together permit the camber of the drive wheels to be easily adjusted without changing the wheelbase or the seat height. The different angles selected for placement of the bores 56 enable the camber angle of the drive wheels 201, 202 to be adjusted according to particular user activities, such as sports activities as shown in FIG. 12. A preselected pair of camber plugs providing for a tow-out of the drive wheels may be provided and is particularly useful for sports activities.

The outer ends 57 of the plugs 55 may be adapted to conform to a curved surface on the chassis. Mounting brackets 58 may be included for securing the plugs 55 to the chassis 10. The brackets 58 may include conventional internal screw patterned passages 59 for attaching the plug 55 to the chassis with screws.

Figure 14A:
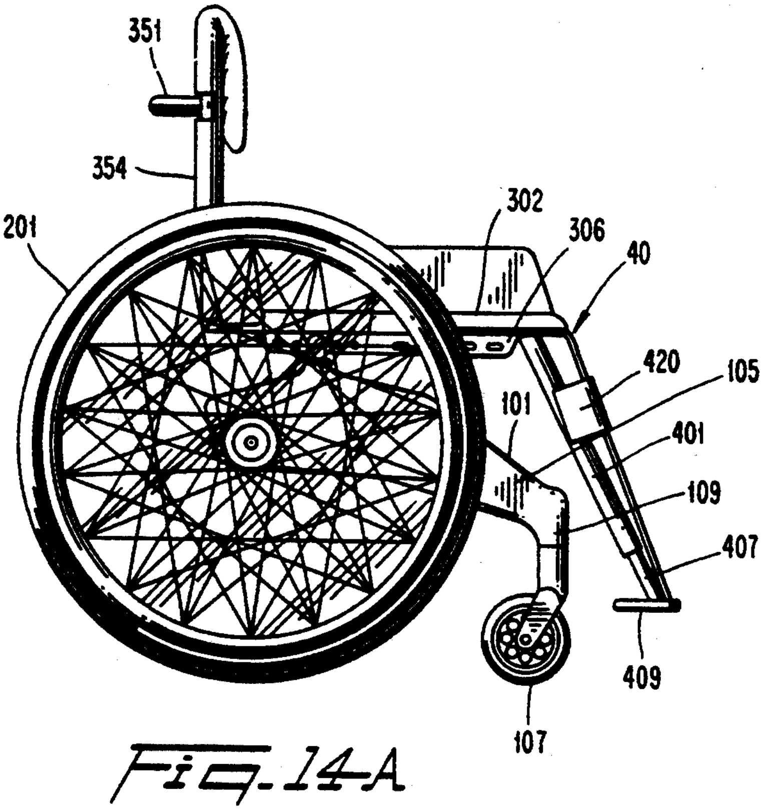
FIG. 14A is a side view of a third embodiment of a wheel assembly as mounted on a wheelchair chassis in accordance with the present invention.

The camber adjustment plug of the present invention may be used to mount virtually any wheel suitable as a drive wheel, including conventional wire spoke wheels as shown in FIG. 13, tensioned disk wheels as shown in FIG. 14A, and drive wheels constructed from composite materials with and without rings and hubs.

For example, the drive wheels may have three composite spokes 61, as shown in FIG. 14. The three spokes are sufficiently broad to prevent the user's clothing from becoming entangled in the spokes. In another aspect (not shown), approximately 5 composite spokes are provided.

Referring to FIG. 12, the drive wheels 201, 202 have a wheel axle which is mounted within the angled wheel alignment plug at the selected camber angle. As shown in FIG. 13, anti-tip wheels may be mountable over the axle of the drive wheels and used therewith. The drive wheels 201, 202 may be standard 24" pneumatic wheels, or may be any wheels functioning with a suitably sized diameter axle. Presently, a ½" diameter steel axle is preferred.

Wheel Assembly

Referring to FIGS. 15–17, the wheel assembly for one side of the wheelchair is shown. Corresponding identical components are used in the opposite side of the wheelchair. The wheel assembly for one side includes a drive wheel 202, a travel wheel assembly 204, and an anti-tip wheel assembly 205. The travel wheel assembly 205 and the anti-tip wheel assembly 206 may be mounted on the axle 203 between the drive wheel 201 and the alignment plug 55 (not shown).

Referring to FIG. 15, the drive wheel 202 is constructed from composite materials with a metal rim and hub and includes a conventional outer propulsion ring 207 for manually rotating the wheels by operation of the user's hands and arms. The wheels may also be formed as tensioned disks as shown in FIG. 14A.

The tensioned disk wheels are formed of two clear plastic disks that each include cord lacings 701 embedded in the disks. The lacings 701 may also be made of nylon, dacron, or other materials having similar properties. A variety of lacing patterns may be used. At the rim edge of each disk, the fibers extend from the disks and loop around a post 702 on the circumference of the wheel. The cord 701 in each disk is typically one endless string. The tensioned disk wheels are specially dished and laced to accommodate side loads created when the wheelchair user tips the wheelchair up onto one wheel. Tensioned wheels are light weight and corrosion resistant, and provide high tensile strength and elasticity to absorb vibrations.

With reference to FIG. 16, an arrangement is depicted for the addition of modular anti-tip wheel assembly 205 to one side of the chassis 10. An identical assembly is mounted on the opposing side of the chassis 10. Within the chassis module 10 is formed a substantially vertical, reinforced well 251 which opens from the bottom face of the chassis and extends to an end plug or wall 252 which establishes the depth of the well 251 within the chassis 10. The well 251 receives a vertical arm 254 of the anti-tip wheel assembly 205. The arm 254 is keyed rotationally, so that it does not rotate relative to the chassis when installed. A button spring 255 may be used to key the arm 254 to prevent relative rotation thereof.

The vertical arm 254 secures and positions an angled support leg 256 which in turn supports a small caster 257. The caster 257 extends rearwardly of the chassis 10 and is positioned just inside the rearward most locus of the drive wheels. Also, the caster 257 is positioned above the riding surface by a distance X, such that the caster 257 is not normally in contact therewith. In the event of a rollback of the wheelchair, the small caster 257 comes into contact with the riding surface or floor and prevents tipover as shown in FIG. 13.

FIG. 17 illustrates a travel wheel assembly 204 for the wheelchair. FIG. 14 illustrates a travel wheel assembly for one side of the wheelchair. An identical assembly is used on the opposing side of the wheelchair. The travel wheel assembly 204 includes a vertical arm 271 and a slightly angled leg 272 that supports and journals a travel wheel 273 which is normally positioned to be just above the travel surface or floor.

The travel wheel 273 is arranged so as to be approximately at the same wheelbase as is provided by the main drive wheel. However, the travel wheel 273 is much smaller than the drive wheel, and it is located inside of the vertical plan footprint of the chassis, so that the user may use the wheelchair to go through narrow aisles, such as are found in airplanes, etc.

When the travel wheel assemblies 204 are needed, they are snap locked into place ahead of time, with a suitable spring loaded snap pin 274, or equivalent locking device. Then, when the main drive wheels are removed, the user rocks the chair to one side, so that one drive wheel on that side of the wheelchair is then demounted. Next, the chair is rocked to the opposite side and now rests on the travel wheel 273 of the side opposite from the side which the main drive wheel has been previously removed. At this point the other main drive wheel may be removed and the wheel chair returned to normal position in which it rests solely upon the front casters and the travel wheels 273.

Wheel Lock

Referring now to FIGS. 18–20, a wheel lock assembly 600 is shown. The wheel lock assembly 600 may be attached or molded into the underside of the chassis 10. The lock 600 is shown open and pressing up against a 14' tire in FIG. 19 and closed and retracted beneath the chassis 10 in FIG. 20.

The wheel lock 600 may be metallic or may be made from composite materials, and includes an adjustable positioning bracket 601 having positioning slots 602 for receiving screws 603. The slots 602 permit the lock 600 to be adjusted forward and backward relative to the chassis 10 when the screws 603 are loosened to thus accommodate tires having a variety of diameters. The wheel lock 600 further includes an actuation lever assembly 604 mounted to the positioning bracket 601 by a pivotable fastener 605, such as a screw, brad, rivet or other suitable pivotable fastening device. As best seen in FIGS. 19 and 20, the actuation lever 604 includes two connecting portions 607, 608 pivotally connected by a fastener 609. A wheel contacting lever 610 is connected both to the actuation lever assembly 604 and the positioning bracket 601 at two pivot locations 611, 612, respectively. The configuration of the actuation lever assembly 604 and the positioning bracket 601 creates a wheel lock 600 such that when the lever assembly 604 is moved in a counterclockwise direction, the contacting lever 610 is moved to contact the drive wheel.

A torsion spring 613 mounted at pivot location 612 causes the lock to automatically move fully to the off position as shown in FIG. 20, as the actuation lever assembly 604 is moved clockwise past a midline defined in FIG. 19 by line B—B. Conversely, the torsion spring 613 causes the lock to automatically move towards the on position as the actuation lever 153 is moved counterclockwise just past the midline B—B to close the lock. The torsion spring 613 biases the lock either in an open or closed position according to movement of the lever assembly 604 approximately 5 degrees beyond the midline B—B. The wheel lock is retracted in its biased position under the chassis when not in use so that shocks occurring during traveling will not cause the lock to move toward the tire.

Seating System

The seating assembly 30 is formed of a generally rectangular frame having two longitudinal side extrusions 301 and 302, and one or more cross-members 303 and 304 respectively secured to the side extrusions at the front and rear of the frame. A front cross-member 303 is seen in FIG. 1 and one side extrusion 301 is seen in FIGS. 3, 21 and 22. The following describes one side of the seat assembly 30. The opposite side of the seat assembly is comprised of identical structure.

A longitudinal mounting rail 305 extends downwardly from the side extrusion 301 and the rail 305 is preferably integrally formed with the side extrusion 301. However, the rail 305 may be fabricated separately and then secured, e.g., by welding, to the underside of the side extrusions 301. The rail 305 includes a plurality of holes 306.

The seating system 30 is demountably attached to the chassis 10 by two pair of mounting posts: a pair of rear posts 307 and a pair of forward posts 308 which telescope upwardly from within the chassis 10. The pair of rear posts 307 adjustably telescope along an upward locus within a pair of rear tubes 309 within the chassis 10, while the pair of forward posts 308 telescope along an upward locus within a pair of forward tubes 310. The pairs of tubes 309, 310 are seen from a top view in FIG. 2. Each tube of each pair are formed to have an upper annular neck portion 312. One tube of each pair 309, 310 is shown for one side of the chassis 10 in FIG. 3. The neck portion 312 of each tube shown in FIG. 3 extends upwardly from the contour of the chassis 10. With regard to the description of the seating system in relation to FIGS. 3, 21 and 22, only one side of the wheelchair, and, hence, only one post of each pair of posts 307, 308 is shown. The opposite side of the wheelchair is comprised of identical structure, hence, the structure is described with reference to both posts. The rear pair of posts 307 may be set at progressively stepped heights by virtue of holes 313 therein. A transverse locking pin is inserted through a selected hole 313 through each of the pair of posts 307 and a transversely aligned hole pair 314 in the corresponding tubes 309. The pair of front posts 308 telescope throughout a continuous range. A pair of compression clamps 315 compress the corresponding annular neck portion 312 of the pair of forward tubes 310 about the corresponding pair of forward posts 309 to lock the posts 309 at a desired height. A levered release nut (not shown) enables the clamps 315 to be released and each of the pair of forward posts 309 to be adjusted without any external tools.

In this manner, the height of the seating system 30 relative to the drive wheels may be easily and readily established. Height adjustment is necessary to provide for the length of a particular user's arms. Correct height is needed in order to provide a comfortable, effective driving relationship between the user's hands and arms and the drive wheels, so that the user may efficiently provide the motive force to drive the drive wheels and thereby propel the wheelchair. It will be understood by those skilled in the art that the selected height of the pair of rear posts 308 may be secured by a compression clamp, that the selected height of the pair of front posts 309 may be secured by locking pins, or that clamps or locking pins may be used for both the pair of rear posts 308 and the pair of front posts 309.

The angle of the seating system 30 relative to the chassis 10 (and to the generally horizontal surface over which the wheelchair 10 is propelled) may be adjusted by offsetting the height of the forward pair of posts 309 relative to the pair of rear posts 308, or vice versa.

Referring to FIG. 3, the rail 305 is adjustably attached to both pairs of mounting posts 308, 309. While there may be a virtually unlimited number of longitudinal attachment positions of the seating system 30 by the rail 305, four positions are shown in FIG. 3 by virtue of the transverse holes 306 through the rail 305. Each of the forward and rear pairs of posts 308, 309 includes a generally U-shaped mount 316 as best seen in FIG. 1. A releasable locking pin 317 is inserted through the U-shaped mount 316 and into a selected one of the transverse mating holes 306 of the rail 305. A locking nut (not shown) may be used with the locking pin 317, or the locking pin 317 may be self-contained with an expansion collet or projection end. (Such self locking pins are in common, widespread use in rigging of sailboats.) In this manner, the center of gravity of the user may be adjusted relative to the chassis 10 and its fixed wheelbase between the drive wheels and the forward casters.

Referring to FIG. 3, the seating system 30 further includes a back rest 350 which adjustably telescopes up and down to adjust to the user. The back rest 350 preferably includes a horizontal push bar 351 which enables an attendant or other caring person to push or pull the wheelchair with or without the user seated therein in a desired direction of travel. The following describes the back rest 350 with regard to only one side of the wheelchair. The opposing side incorporates identical back rest structure.

The back rest 350 is hinged to the seat frame at a pivot axis 352 by a pair of hinge plates 353 which are respectively joined to a pair of side tubes 354 of the seat frame. A back rest 354 includes side legs which adjustably receive the back rest 350. The back rest 350 may telescope up and down relative to the seat frame. Adjustment holes 355 through each of the pair of side tubes 354 enable a locking pin (not shown) to fix the height of the back rest 350 at a desired position. The back rest 350 may include a webbed or non-webbed fabric material effectively secured to the back rest frame 354 in order to provide a comfortable back rest function to the user when seated in the wheelchair. The fabric material may or may not include padding for added comfort of the user.

Turning now to FIGS. 23 and 24, an angle adjustment mechanism for the back rest 350 will be described. While the back rest 350 is adapted to pivot relative to the seat frame at the pivot axis 352, the back rest 350 is normally locked in an upright position by virtue of a spring-loaded latching mechanism 360.

The latching mechanism 360 includes a flanged and threaded stud 361 which threads into one of the pair of side tubes 354, and a forked locking block 362 which is biased outwardly from the seating system by spring 363. The locking block 362 and loading spring 363 are located within the side extrusion 301. A flange 364 of the stud 361 is sized to be wider than a slot 365 of the locking block 362. An inclined ramp surface 366 of the locking block 362 is contacted by the flange 364 of the stud 361 as the back rest 350 is rotated around axis 352 to an upright position. The ramp surface 366 causes the locking block 362 to move forwardly and deflect the loading spring 363 until a position is reached wherein the flange 364 of the stud 361 has passed beyond the locking block 362, and the locking block 362 has snapped back to lock over the flange 364 as shown in FIG. 23. In this manner, the stud 364 is secured and the back rest 350 is locked in an upright position.

Referring to FIGS. 23 and 24, a release bar 367 enables the locking block 362 to be moved to compress the loading spring 363 until the loading block 362 clears the flange 364 of the stud 361. When the loading block 362 has been so moved, the back rest 350 may be pivoted forward around axis 352. When pivoted forward, the stud 361 may be threaded inwardly or outwardly so as to adjust the angle of the back rest when pivoted back to the operating position. The back rest 350 may also be pivoted forward so as to fully fold the seating system as shown in FIGS. 21 and 22.

Figure 25:
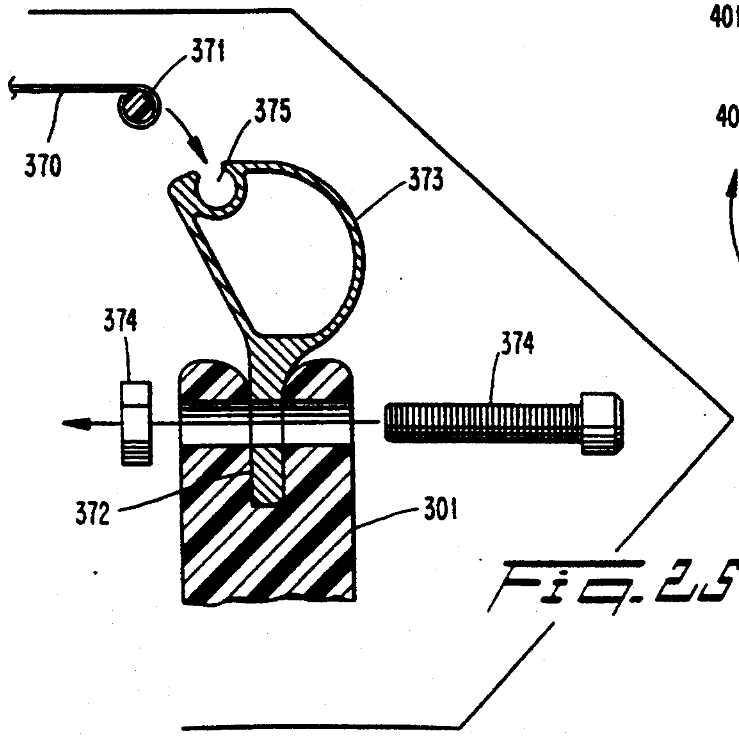
FIG. 25 is a partial cross-sectional view of a second embodiment of a seat attachment assembly.

A padded seat cushion may be easily attached to the side rail extrusions 301, 302 by a pair of rails 373 which slide into longitudinally slotted recesses or keyways 372 of the extrusions 301, 302. The rails 373 are secured in the extrusions 301, 302 by conventional fasteners 374. Alternatively, as shown in FIG. 25, a webbed seat 370 of suitable fabric material, such as canvas, may be installed upon the seat frame simply by forming the material around a suitably sized rod 371, such as a plastic dowel, and then siding the rod 371 fully into a keyway 375 of the rail 373. Only one extrusion 301 is shown in FIG. 25. Identical structure is used for the opposite extrusion 302. In this manner, either conventional, universal webbed seats may be installed upon the seating system frame or padded seats of varying designs and comfort-providing characteristics may also or alternatively be installed upon the frame. Simply molded seating systems may also be attached to the seat-frame. Such molded systems have less adjustability but are convenient for short term uses where comfort is not of prime importance, such as sports events, showers and bathing, or travel purposes.

Leg Rest Assembly

Referring to FIG. 1, the modular leg rest assembly 40 is pivotally mounted to the front cross-bar 303 of the seating system 30. The leg rest assembly 40 includes two tubes 401, 402 which are connected to each other along a common seam 403. One or more compression clamps 404 and 405 respectively attach the tubes 401, 402 to the cross-bar 303. The compression clamps 404, 405 are compressed and released by operation of a common actuation lever 406. Rotation of the lever 406 causes the clamps 404 and 405 to lock the leg rest assembly 40 at a desired position relative to the seating system 30.

Two footrest shafts 407 and 408 coaxially telescope along an upward locus within the tubes 401 and 402 respectively. A single tube may be used to accommodate the telescoping shafts 407 and 408. The footrest shafts 407 and 408 may be set independently at progressively stepped heights by virtue of transverse locking pins (not shown) passing through a selected opening through the corresponding tubes 401 and 402. Alternatively, the tube position for the selected height may be set with a conventional clamp such as a ring clamp.

A right laterally extending footrest 409 is secured at an inner end of the footrest shaft 407 and is thereby positioned by adjustable extension of the shaft 407. An outer support cable 411 attaches between a lateral end of the right footrest 409 and a right side extrusion 301 of the seating system (shown on the left side of the front elevation drawing of FIG. 1) and also permits height adjustments to be made to the right footrest 409.

A left footrest 410 is secured to an inner end of the footrest shaft 408 and is also thereby positioned by adjustable extension of the shaft 408 relative to the tube 402. A lateral support cable 412 attaches between an outer end of the left footrest 410 and the left side extrusion 302 of the seat frame. The outer cable 412 also permits height adjustments to be made to the left footrest 410 which are independent of the height adjustments made to the right footrest 409, as suggested by differing footrest heights shown in FIG. 1.

The outer cables 411, 412 are constructed of an elastic material and are maintained under tension to provide axial alignment support to the outer ends of the footrests. Alternatively, the outer cables may be a rigid material, such as a rigid metal cable, or the outer cables may be telescoping tubes maintained under tension with a spring or elastic cord. A leg support sling 420 formed of a suitable webbed or non-woven fabric material may be loosely and adjustably suspended across the outer support cables 411 and 412 to enable the user's calves to be conveniently and comfortably supported.

The angle of the entire leg rest assembly 40 may be easily adjusted by partially releasing the clamps 404 and 405 with the actuation lever 406 and thereupon rotating the leg rest assembly 40 relative to the seat frame as shown in FIG. 21. When rotated fully outwardly, the user's legs and knee joints are fully extended. When rotated to an intermediate position, the user's knees are at a 90 degree angle. Rotation to a fully inward position may be used to store the wheelchair. The leg rest assembly 40 is positioned behind the frame in order to facilitate entry and exit from the wheelchair. The pivot attachment of the leg rest assembly 40 enables a therapeutically determined knee angle for the user to be preselected and maintained. When the desired angle is reached, the actuation lever 406 is manipulated simultaneously to tighten the clamps 404 and 405.

Figure 26:
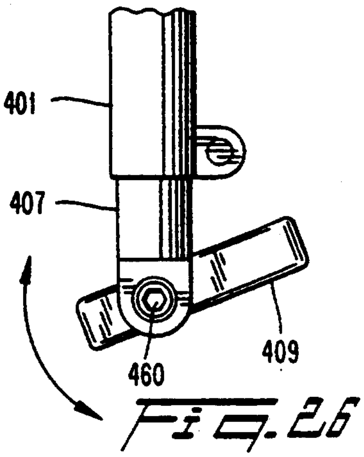
FIG. 26 is a side view of a foot rest as depicted in FIG. 1.

As shown in FIG. 26, the right footrest 409 may be pivotally attached to the shaft 407 by locking nuts 460 thereby enabling the footrest angle to be adjusted to accommodate changes in the knee angle according to the user's preference. The left footrest is identically configured.

Either footrest 409, 410 may be removed by removal of either of the shafts 407, 408 from the tubes 401 or 402 and disconnection of the support cables 410 or 411, as the case may be for a single amputee.

For double amputees, the entire leg rest assembly 40 may be removed from the seat frame upon full release of the clamps 404 and 405 and removal of the tubes 401 and 402. Partial release of the clamps 404 and 405 enables the leg rest assembly to be folded under the seat frame after the seating system 30 has been disconnected from and removed from the wheelchair chassis, as shown in FIG. 22. This arrangement enables the entire seating system 30 including the seat frame, back rest 350 and leg rest 40 to be nested together for storage or convenient transportation as in the overhead luggage compartment of an airplane.

In another aspect of the leg rest assembly 40 shown in FIGS. 6, 7 and 27, a single vertical tube 450 is pivotally mounted to the front cross-bar 303 of the seating system. Compression clamps attach the single, extensible tube 450 to the cross-bar 303, as described above. A single footrest shaft 451 is secured at an inner end of the tube 450 and is positioned by extending the tube 450. The transversely aligned footrest 452 defines forwardly positioned protrusions which terminate in a pair of bumper knobs 453. The knobs 453 may be formed from rubberized materials which protect the feet and which enable the user to push against doors or other objects. The footrest 452 is elliptically shaped as best seen in FIG. 7 so as to enable the user's feet to be positioned to a select therapeutic ankle angle. The range of ankle positions may thereby be adjusted in conjunction with a selected knee angle selected by adjusting the compression clamps.

Figure 28:
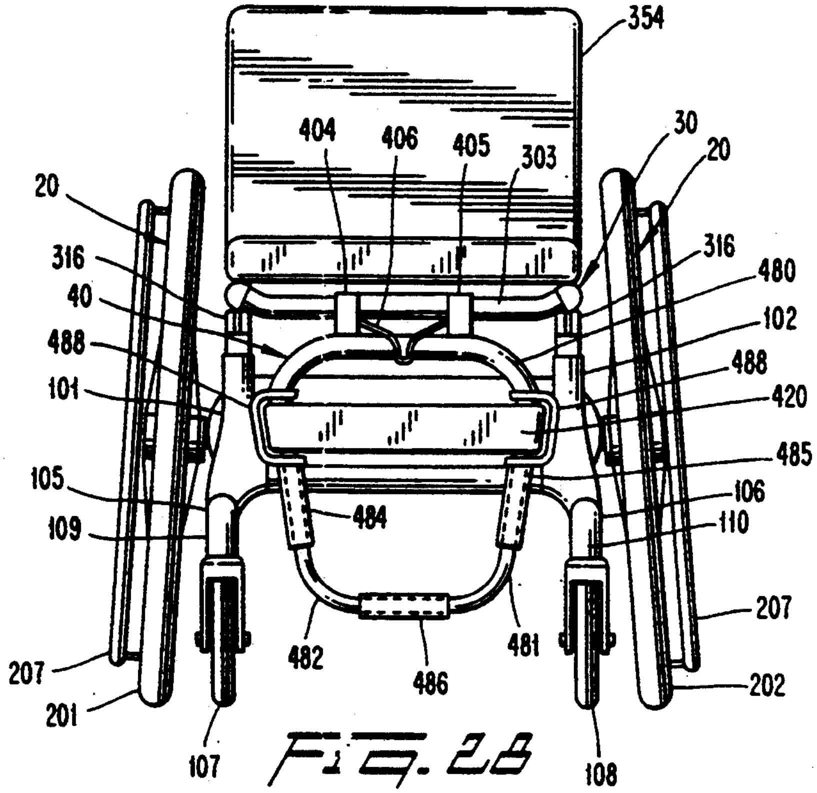
FIG. 28 is a front view of a wheelchair having a third embodiment of a leg rest assembly in accordance with the present invention.

The leg rest assembly may be formed of a single shaped tube 480, generally in an inverted U shape as shown in FIG. 28. The U-shaped tube 480 provides an attachment to a pair of telescoping legs 481 and 482 of an adjustable footrest tube 483. The two telescoping legs 481 and 482 may be adjustably moved upwardly and downwardly within portions 484 and 485 of the U-shaped tube 480. Since the portions 484 and 485 are angled inwardly, as the legs 481 and 482 adjustably telescope within portions 484 and 485, lateral portions of the legs 481 and 482 simultaneously telescope within a lateral foot support structure 486. The generally U-shaped single tube 480, is particularly suitable for protection against impact from the side during sports events, and it provides a convenient handle or grip to enable the user to pull himself or herself from the floor and back into the wheelchair.

Figure 29:
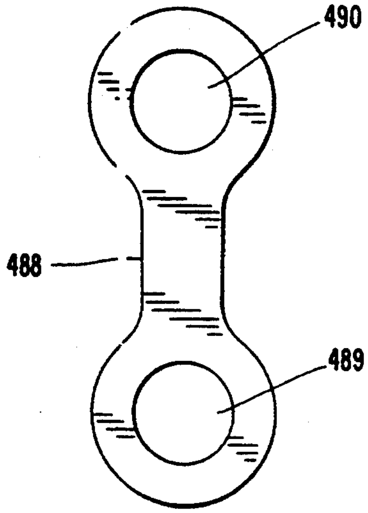
FIG. 29 is an enlarged view of a rubber retention member used to secure a calf strap on the leg rest assembly in accordance with the present invention.

To ensure that the leg support sling 420 remains situated at a desired location on the U-tube 480, a rubber retention member 488 is used. Referring to FIG. 29, the two ends having two opposing holes 489, 490 are positioned above and beneath the sling 420 on the tube 480 at the desired location. Two members 488 are used, one for either side of the sling 420. In this manner, the sling is prevented from sliding along the tube 480.

Although the presently preferred embodiment of the invention has been illustrated and discussed herein, it is contemplated that various changes and modifications will be immediately apparent to those skilled in the art after reading the foregoing description in conjunction with the drawings. For instance, the specifications of the molded chassis may be preselected to mount a variety of seating assemblies, with or without leg rest assemblies, thereby enabling the user to participate in activities such as sports, or to use the wheelchair in the shower. The wheel alignment plugs permit most desired wheel systems to be easily mounted to the universal chassis. Accordingly, it is intended that the description herein is by way of illustration and should not be deemed limiting the invention, the scope of which being more particularly specified and pointed out by the following claims.

What is claimed is:

1. A leg rest assembly for a wheelchair comprising:

a main support member rotatably connectable at one end to a cross bar of said wheelchair, said cross bar extending laterally across substantially the width of said wheelchair;

a footrest assembly connected to an opposite end of said main support member, said footrest assembly being adjustable relative to said main support member so as to accommodate a particular length of a user's leg, said footrest assembly including at least one foot plate, said main support member including two hollow tubes, said footrest assembly including two shafts with a foot plate attached to each of said shafts, each of said hollow tubes being sized to receive a respective one of said shafts such that said shafts may be telescopically positioned within the respective tube, each tube having means for securing the tube within the respective shaft at a desired position; and clamping means for adjustably connecting said main support member to said cross-bar, said clamping means being selectively engageable so as to secure said main support member at a desired angular orientation relative to a seat assembly of said wheelchair, each foot plate including a cable for supporting ankle and calf support straps on said footrest assembly, each of said cables extending from an outer side of a corresponding foot rest to said seat assembly.

2. A modular wheelchair comprising:

a main frame which includes two spaced apart opposing side rails which are connected by a pair of cross bars, each of said side rails having a cantilevered arm, each cantilevered arm including caster wheel mounting means for receiving a caster wheel, the cantilevered arm of each side rail being angled outwardly relative to a remaining portion of each side rail;

main drive wheel mounting means on each side rail for mounting a main drive wheel;

a pair of main driving wheels for being individually mounted on one of said main drive wheel mounting means so that the main driving wheels are disposed on opposite sides of said main frame with the main frame spaced above a travel surface by a predetermined distance;

a pair of casters for being individually mounted on one of said caster wheel mounting means so that the caster wheels are disposed on opposite sides of said main frame and forward of said pair of main driving wheels; and a seat securable to each of said side rails so as to extend across the side rails of the main frame.

3. A modular wheelchair according to claim 2, wherein said seat is a seat assembly that includes two side elements, a back rest tube pivotally mounted on a respective side element for movement between a generally upright locked position and a downwardly folded position, a movable locking block disposed on each respective side element, a spring operatively associated with each locking block for providing a biasing force to urge the locking block into locking engagement with a lower portion of the respective back rest tube, and means for allowing the locking blocks to be urged away from the back rest tubes to disengage each locking block from the respective back rest tube to allow the back rest tubes to be moved from the generally upright locked position to the downwardly folded position.

4. A modular wheelchair according to claim 2, further comprising a leg rest assembly adjustably securable to said seat, said leg rest assembly being foldable beneath said seat.

5. A modular wheelchair according to claim 4, wherein said seat includes a seat frame having a cross bar spanning substantially the width of said main frame at a forward location of said wheelchair, said leg rest assembly being adjustably attached to said cross bar.

6. A modular wheelchair according to claim 5, wherein said leg rest assembly includes at least one telescoping shaft assembly for configuring the leg rest assembly to a desired length, said shaft assembly being rotatably fixed by at least one compression clamp to one of said cross bars whereby release of said at least one compression clamp allows said shaft assembly to rotate through at least 180 degrees around said one cross bar.

7. A modular wheelchair according to claim 6, wherein said telescoping shaft assembly includes two legs connected to a footrest tube to generally form a U-shaped leg rest assembly, said two legs angled inwardly towards said footrest tube.

8. A modular wheelchair according to claim 4, wherein said leg rest assembly includes a means for supporting a user's calves, said means for supporting being maintained in a desired position by a retention member mounted on said leg rest assembly.

9. A modular wheelchair according to claim 2, wherein at least the side rails of said main frame are formed of a material suitable for resiliently yielding to vibration and shock.

10. A modular wheelchair according to claim 2, wherein the cantilevered arm of each side rail is angled downwardly toward said travel surface relative to a remaining portion of said side rail.

11. A modular wheelchair according to claim 2, wherein said seat includes a seat frame formed of at least two side extrusions connected by at least one cross member, said seat further including a first and second pair of mounting posts adjustably connectable to said side extrusions, said first and second pair of mounting posts receivable in a first and second pair of receptacles of said main frame, said first and second pair of receptacles positioned at fore and aft locations, respectively, in said main frame.

12. A modular wheelchair according to claim 11, wherein each of said side extrusions include means for selectively fixing said first and second pair of posts at a plurality of locations along a length of said side extrusions such that the center of gravity of said seat assembly is adjustable relative to said main frame.

13. A modular wheelchair according to claim 12, wherein said first and second pairs of posts are each telescopically movable within said first and second pair of receptacles such that said posts may be fixed at a predetermined desired height relative to said main frame and thereby position said seat frame at a desired angle relative to a horizontal plane.

14. A modular wheelchair according to claim 11, wherein said seat assembly further includes a back rest rotatably attached to said seat frame, said back rest being rotatable so as to lay flat against said seat frame.

15. A modular wheelchair according to claim 2, further comprising means for selectively locking each of said pair of drive wheels, said means for locking being fixed to said main frame and including means for biasing said means for locking in one of a locked and unlocked position.

16. A wheelchair comprising:

a main frame;

caster wheel mounting means disposed on opposite sides of the main frame for mounting a caster wheel on opposite sides of the main frame;

a pair of caster wheels for being individually mounted on respective caster wheel mounting means;

main drive wheel mounting means disposed on opposite sides of the main frame for mounting a main drive wheel on opposite sides of the main frame;

a pair of main drive wheels for being individually mounted on respective main drive wheel mounting means;

a seat assembly mounted on the main frame for allowing an individual to sit, said seat assembly including two side elements, a back rest tube pivotally mounted on each respective side element for movement between a generally upright locked position and a downwardly folded position, a movable locking block mounted on each respective side element, a spring operatively associated with each locking block for providing a biasing force to urge the locking block into locking engagement with a lower portion of the respective back rest tube, and means for allowing the locking blocks to be urged away from the back rest tubes to disengage each locking block from the respective back rest tube to allow the back rest tubes to be moved from the generally upright locked position to the downwardly folded position.

17. A wheelchair according to claim 16, wherein each locking block engages an end of a threaded screw extending from a lower end of the respective back rest tube.

18. A wheelchair according to claim 16, wherein each locking block includes an inclined ramp surface which engages the lower portion of the respective back rest tube when the back rest tube is moved from the downwardly folded position to the generally upright locked position.

19. A wheelchair according to claim 16, wherein said main frame includes a pair of side rails connected together by at least one cross bar, each side rail including a cantilevered arm which is angled outwardly relative to a remaining portion of the respective side rail.

20. A wheelchair according to claim 19, wherein said two side elements are tubular and house a respective one of the springs, the two side elements forming a part of a rectangular frame.

21. A wheelchair according to claim 20, including a mounting rail extending from each side element, each mounting rail being provided with a plurality of through holes for mounting a pair of posts at different positions.

22. A wheelchair according to claim 21, wherein each of said side rails includes two receptacles for receiving the pair of posts mounted on one of the mounting rails.

* * * * *